April 21, 1953  F. ERRINGTON  2,636,126

WAVE-ENERGY DIRECTION-FINDING APPARATUS

Filed June 4, 1948

Inventor
Frederick Errington
By
Herbert H. Thompson
his Attorney.

Patented Apr. 21, 1953

2,636,126

UNITED STATES PATENT OFFICE 2,636,126

WAVE-ENERGY DIRECTION-FINDING APPARATUS

Frederick Errington, London, England, assignor to The Sperry Corporation, Great Neck, N. Y., a corporation of Delaware Application June 4, 1948, Serial No. 31,170
In Great Britain June 3, 1947

15 Claims. (Cl. 250—33.65)

This invention relates to a wave-energy direction-finding apparatus of the type in which a collimating or directive reflector, usually in the form of a paraboloid of revolution, co-operates with wave-energy absorbing units in such a manner that the path of the major portion of the wave-energy that crosses the aperture of the reflector in a particular direction and is reflected by the reflector intersects one at least of these units, and in which one of the units is traversed repetitively through a closed orbit relatively to the reflector in order to change repetitively the particular direction of energy crossing aperture of the reflector whose path intersects that unit.

The invention is particularly applicable to radio direction-finding apparatus, in which case each or any unit may be an absorber of electromagnetic wave energy, such as a dipole antenna or a wave-guide flare, or may be arranged, as in pulse radar systems, to operate alternately as a radiator of and absorber of electromagnetic wave energy. However, the invention is also applicable to other wave-energy direction-finding apparatus, such as apparatus operating by means of sonic or supersonic waves in a fluid, such as air or water, or operating by means of infra-red, visible, or ultra-violet light. In such other applications of the invention the units will, of course, be suitable to absorption and/or radiation of wave-energy of the nature employed.

In such direction-finding apparatus the wave-energy received is modulated in a manner that depends upon the deviation of the direction of energy passing the aperture of the reflector that is reflected to the energy-absorbing unit from the direction of an object from which such energy emanates, and this modulation comprises a fundamental component at the frequency at which the absorbing unit is traversed about its orbit. The direction of the object is usually ascertained from the amplitude and phase of this modulation. However, the wave-energy emanating from the object and reaching the absorbing unit may also be, and usually is, additionally undesirably modulated owing to changes of aspect of the object, changes of attenuation of the energy in transmission and similar causes. Such additional undesired modulation is usually referred to as fading. Fading tends to mask the directional modulation and to cause unsteadiness and inaccuracy of the indication or measure of the direction of the object derived from the energy received by the absorbing unit. In order to minimise this cause of unsteadiness and inaccuracy, arrangements have been proposed, comprising one or more secondary absorbing units so arranged that the relationship of the magnitude of the modulation due to deviation of the direction of energy crossing the aperture of the reflector that is reflected to the energy-absorbing unit to the magnitude of the modulation due to fading is different for the secondary absorbing units from that which obtains for the primary absorbing units. The outputs of the primary and secondary units were then combined in such a manner as substantially to eliminate the modulation due to fading.

Such prior proposed arrangements, however, have usually involved multiple coaxial rotatable joints between the units and the receiving and/or transmitting apparatus respectively associated with them, and such rotatable joints are prone to cause difficulties in design, manufacture and operation.

According to the present invention, a wave-energy direction-finding apparatus comprises, in combination with a directive reflector, a first energy-absorbing unit that is traversed repetitively through a closed orbit or closed-curve path, and a plurality of secondary energy-absorbing units mechanically connected with one another and driven synchronously with the first energy-absorbing unit in individual orbits and so arranged that the departure of the resultant or virtual centre of energy-absorption, corresponding to the secondary-energy-absorbing units from the position that is the mean or average of all positions in its orbit, is always of opposite sign to and is of a magnitude having a definite relationship to that of the corresponding departure from the position that is the mean or average of all the positions in its orbit of the first energy-absorbing unit. Collision or interference of the first and second energy absorbing units in traversig their orbits may then be avoided. For example, the secondary energy absorbing units may be arranged so that they are wholly outside the orbit of the first energy-absorbing unit, and so that their orbits do not overlap or intersect the orbit of the first energy-absorbing unit.

Preferably the orbit of the first energy-absorbing unit is substantially circular with its centre on or near the axis or focus of the reflector. In this case, the orbits of the secondary energy-absorbing units are also circular and may have the same radius as the circular orbit of the first energy-absorbing unit. The secondary absorbing units may in this case be so arranged that the virtual or resultant centre of energy-absorption travels in an orbit that is concentric with the orbit of the first energy-absorbing unit and which may be of the same or different radius. However, the secondary energy-absorbing units that are driven synchronously with the first energy-absorbing unit are arranged so that the virtual or average centre of absorption is 180° out of phase in its orbit with respect to the first energy-absorbing unit.

Conveniently two secondary energy-absorbing units are employed, and the centres of the circular orbits in which they are driven synchronously with the first energy-absorbing unit then lie in a straight line in which also lies the centre of the orbit of the first energy-absorbing unit. Moreover, the centres of orbits of the secondary energy-absorbing units may be equidistant from the centre of the orbit of the first energy-absorbing unit, in which case, the absorption capacities of both, or of all, the secondary units should be equal.

In carrying out the invention in practice both the first and each of the secondary energy-absorbing units may be carried through their orbits by circular translatory motions not involving rotation of the units. In this manner coaxial joints for connecting the units to other parts of the direction-finding apparatus and for conducting the energy flow from the units are not required. Moreover, joints adapted for continuous rotation are not required, but joints suitable for limited angular motion may be employed.

When the invention is employed, an output depending upon the joint absorption of the secondary energy-absorbing units may be modulated or mixed with an output depending upon the energy absorption of the first energy-absorbing unit in such a manner that the modulation of the resultant output contains a component that is dependent in phase and magnitude substantially only upon the modulation resulting from the transit through its orbit of the first energy-absorbing unit and from which substantially all modulation components of the total received energy that are due to what has been termed fading are substantially eliminated.

For the better understanding of the invention, one particular embodiment of it, applicable to a pulse radar direction finding equipment, will now be described, by way of example only, with reference to the accompanying drawing, in which.

Figure 1:
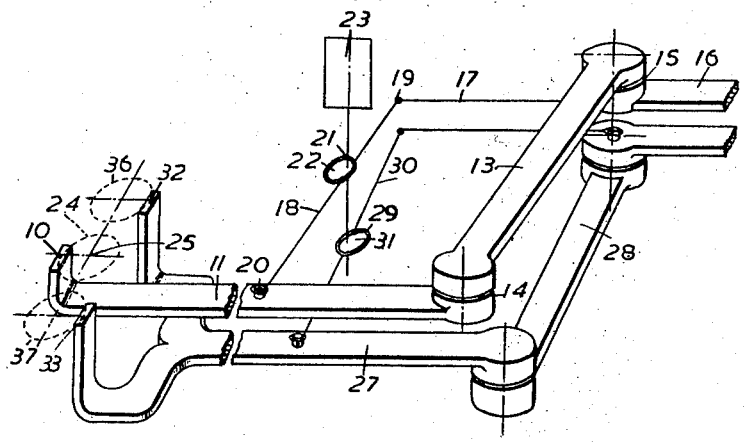
Figure 1 is a diagrammatic perspective view, not drawn to scale.
Figure 2:
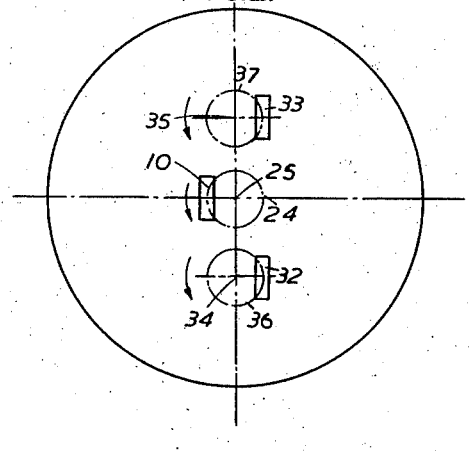
Figure 2 is a purely diagrammatic front view, looking into a directive reflector and illustrating the dispositions of three-wave guide flares, shown in Figure 1, and their orbits.

Referring now to Figure 1, a first energy absorbing or coupling unit is constituted by a flare or mouth 10 attached to a first waveguide limb 11. This limb 11 is carried and controlled by means of a quadrilateral linkage (of the kind described in the specification accompanying our British Patent Application 14,680/47 dated June 3, 1947) of which two adjacent links may be respectively constituted by the waveguide limb 11 and another waveguide limb 13, a flexible or angularly deflectable joint 14 being provided at the junction of these two waveguide limbs 11, 13. The waveguide limb 13 is connected to a fixed length 16 of waveguide by a further flexible or angularly deflectable joint 15.

The remaining links of the quadrilateral linkage may consist of bars or rods 17 and 18 pivoted to one another at 19, and, respectively, to a point 20 on the waveguide limb 11 that carries the flare 10, and to the joint 14 of the waveguide limb 13 with the fixed portion of waveguide 16.

Any convenient point on the quadrilateral linkage, for example a point between the ends of the bar or rod 18, may be coupled by a strap 21 to an eccentric 22 that is rotated by an electric or other motor 23, so that this point is carried through a circular orbit and the flare 10 is carried also through a circular orbit 24, the centre 25 of which is arranged at the focus of a paraboloid reflector 26, a fragment only of which is delineated in the drawings.

A similar quadrilateral linkage having two limbs 27 and 28 constituted by sections of waveguide is arranged parallel with the first linkage and is moved by a strap 29 secured to its bar or rod 30 and engaging an eccentric 31 that may be driven by the motor 23 that drives the eccentric 22. The eccentric 31 is, however, angularly displaced by 180° from the eccentric 22 so that the circular motion imparted to the second quadrilateral linkage is displaced 180° in phase from that imparted to the first quadrilateral linkage.

The free end of the waveguide limb 27 is bifurcated and is terminated by two flares or mouths 32 and 33 that are spaced apart by a distance somewhat greater than the diameter of the orbit 24 of the flare 10, and that are disposed so that the centres 34 and 35 of the orbits through which they are traversed by their quadrilateral linkage lie on a line containing the focus 25 of the reflector about which the flare 10 of the first waveguide is translated in a circular orbit.

Thus, when the motor 23 is rotating, the flare 10 carried by the quadrilateral linkage is carried in circular orbit 24 about the focus and axis of the reflector 26 with a circular translatory motion not involving rotation of the flare, while the two secondary flares 32 and 33 are similarly carried in orbits 36 and 37 about axes parallel with, on opposite sides of, and equidistant from the focus 25 and axis of the reflector 26. The motions of the first flare 10 and the two secondary flares 32 and 33 are, however, displaced in phase by 180°, so that the departure of their resultant centre of energy absorption from the position that is the mean or average of all positions in its orbit is always of the opposite sign to, and equal in magnitude to, the corresponding or simultaneous departure from the position that is the mean or average of all positions in its orbit 24 of the first flare 10.

Preferably, the quadrilateral linkages and eccentrics 22 and 31 are such that the orbits 24, 36 and 37 of the three flares have equal radii and, as above indicated, the virtual or resultant centre of energy absorption of the two secondary flares 32 and 33 traverses an orbit that is concentric with the orbit of the first energy absorbing unit 10. The centres 34 and 35 of the orbits 36 and 37 of the secondary flares 32 and 33 are, in the case shown, equidistant from the centre 25 of the orbit 24 of the first flare and, in this case, the absorption capacities of both of the secondary flares 32 and 33 should be equal. This again is not essential so long as the absorption capacities of the two flares 32 and 33 are so related to the geometry of their respective orbits that the virtual or average centre of absorption is 180° out of phase in its orbit with respect to the flare 10. Moreover, while only two secondary flares 32 and 33 have been shown in the drawings and described, any greater number may be utilised subject to the same restriction that their virtual or average centre of absorption is 180° out of phase with respect to the first energy-absorbing unit and travels in an orbit of similar configuration.

It will be appreciated that the above description is given by way of example only and that many modifications may be made without departure from the scope thereof.

I claim:

1. Radiant energy direction-finding apparatus comprising a paraboloid reflector, a first energy-absorbing unit, means for directing said unit in a closed-curve path, the center of said closed-curve path substantially coinciding with the focal point of said reflector, a further energy-absorbing unit, and means for directing said further unit in a further closed-curve path, both of said units being positioned to cooperate with said reflector, said closed-curve paths being physically displaced from one another.

2. Ultra high frequency apparatus comprising means for changing the direction of rays of electromagnetic energy waves, first and second electromagnetic energy coupling units positioned to cooperate with said first-mentioned means, and means for moving said first and second coupling units, the regions of movement of said respective units being displaced in space.

3. Ultra high frequency direction-finding apparatus comprising means having an axis for substantially collimating electromagnetic energy, first and second electromagnetic energy coupling means for cooperating with said collimating means, means for displacing said first coupling means in a first region, and means for displacing said second coupling unit in a second region, said first and second regions being physically displaced in space.

4. Radiant energy direction-finding apparatus comprising means having an axis for changing the direction of rays of electromagnetic energy waves, first and second electromagnetic energy coupling units positioned to cooperate with said ray direction changing means, means for directing said first coupling unit in a first path, said first path surrounding said axis, and means for directing said second coupling unit in a second path, said first and second paths being physically displaced, said apparatus when employed for radiating radiant energy being effective for maintaining the plane of polarization of said radiant energy substantially constant.

5. Ultra high frequency direction-finding apparatus comprising means having an axis for collimating electromagnetic energy, a plurality of electromagnetic coupling units positioned to cooperate with said collimating means, and means for directing said units in different paths, the center of the area of one of said paths substantially lying along said axis.

6. Apparatus as in claim 5 wherein all of said paths are substantially disposed in a plane perpendicularly oriented relative to said axis.

7. Apparatus as in claim 6 wherein each of said coupling means includes the mouth of a waveguide.

8. Wave-energy direction-finding apparatus comprising a directive reflector having the form of a paraboloid of revolution, three energy-absorbing units, and means for causing said units to traverse separate circular paths, all of said paths substantially lying in a plane disposed at right angles to the axis of said antenna.

9. Apparatus as in claim 8 wherein at least one of said paths has a center substantially positioned along the axis of said reflector.

10. Apparatus as in claim 8 wherein said means for causing said units to traverse circular paths includes means for imparting a phase displacement of 180° to the motion of one of said energy-absorbing units relative to the motion of one of said other energy-absorbing units.

11. Radiant-energy direction-finding apparatus comprising a paraboloid reflector, a first waveguide mouth located in a plane perpendicularly disposed to the axis of said reflector, means for directing said first mouth in a first circular path with a center lying substantially along said axis and with a predetermined diameter, second and third wave-guide mouths also located in said plane, and means for directing said second and third mouths in additional circular paths with a motion 180° out-of-phase with the motion of said first mouth in said first path, said additional circular paths having diameters substantially equal to said predetermined diameter and being close to but spaced from one another, all of said mouths having substantially equal energy absorbing capacities, whereby fading effects are minimized.

12. High frequency apparatus comprising a paraboloid reflector having a focal point positioned on the axis of revolution of the reflector, a first wave-guide terminating in a mouth movable in and restricted to a region of movement including the focal point, and a second wave-guide bifurcated at one end to form two wave-guide portions, each of said portions terminating in a mouth, said mouths being positioned on either side of the first wave guide mouth and movable in and restricted to predetermined regions of movement, all of said mouths being located substantially in a plane passing through the focal point and perpendicular to said axis of said reflector.

13. Radio direction-finding apparatus comprising a paraboloid reflector, a plurality of separate energy-absorbing units individually positioned to cooperate with said reflector, and means for causing each of said units to traverse an individual closed-curve path, one of said individual paths having a center substantially along the axis of said reflector, and at least one of said individual paths having a center materially displaced from the axis of said reflector.

14. Apparatus as in claim 13 wherein all of said energy-absorbing units are disposed substantially in a plane passing through the focal point and perpendicular to the optical axis of said reflector.

15. Directional radiant-energy apparatus comprising a paraboloid reflector, a first wave guide means terminating in a mouth, a second wave guide means bifurcated at one end to form two wave guide portions, each of said portions terminating in a mouth, all of said mouths being located substantially in a plane passing through the focal point and perpendicular to the optical axis of said reflector, and means for imparting motion to said first and second wave guide means, said motion imparting means including first and second linkage means, first and second eccentrics, and means for driving said eccentrics, said first and second linkage means being connected to said first and second wave guide means respectively, said first and second linkage means being further connected to and controlled by said first and second eccentrics respectively.

F. ERRINGTON.

(References on following page)

References Cited in the file of this patent

UNITED STATES PATENTS

| Number | Name | Date |
|---|---|---|
| 386,931 | Pulsifer | July 31, 1888 |
| 1,412,652 | Bouvier | Apr. 11, 1922 |
| 2,082,347 | Leib et al. | June 1, 1937 |
| 2,243,523 | Davis | May 27, 1941 |
| 2,411,472 | Slobod | Nov. 19, 1946 |
| 2,412,867 | Briggs et al. | Dec. 17, 1946 |
| 2,419,024 | Iams | Apr. 15, 1947 |
| 2,419,556 | Feldman | Apr. 29, 1947 |
| 2,457,562 | Karleen | Dec. 28, 1948 |
| 2,460,326 | Woodruff | Feb. 1, 1949 |
| 2,480,829 | Borrow et al. | Sept. 6, 1949 |
| 2,491,493 | Goldberg | Dec. 20, 1949 |